United States Patent [19]

Herziger et al.

[11] Patent Number: 4,788,691
[45] Date of Patent: Nov. 29, 1988

[54] METHOD FOR THE OPERATION OF A GAS LASER AND A GAS LASER OPERATED IN ACCORD THEREWITH

[76] Inventors: Gerd Herziger, Fassanweg 2, D-6101 Rossdorf; Helmut Schülke, Max-Reger-Strasse 4, D-6110 Dieburg, both of Fed. Rep. of Germany

[21] Appl. No.: 847,174
[22] PCT Filed: Jun. 25, 1985
[86] PCT No.: PCTDE85/00213
§ 371 Date: Feb. 13, 1986
§ 102(e) Date: Feb. 13, 1986

[30] Foreign Application Priority Data

Jun. 26, 1984 [DE] Fed. Rep. of Germany ....... 3423525

[51] Int. Cl.$^4$ ............................................. H01S 3/097
[52] U.S. Cl. ....................................... 372/84; 372/87
[58] Field of Search ............... 372/81, 84, 83, 87, 372/58

[56] References Cited

U.S. PATENT DOCUMENTS

| 3,879,681 | 4/1975 | Godard et al. | 331/94.5 PE |
| 4,093,927 | 6/1978 | Levine | 372/84 |
| 4,178,563 | 12/1979 | Huet et al. | 372/84 |
| 4,258,335 | 3/1981 | Donon | 372/84 |
| 4,292,600 | 9/1981 | Neracher | 372/84 |

FOREIGN PATENT DOCUMENTS 2430241 1/1975 Fed. Rep. of Germany ..................... H01S/3-097

OTHER PUBLICATIONS

Baranov et al., "Use of a Discharge ... Excimer Lasers," Soviet J. of Quantum Electronics, vol. 8, No. 1, 1981, pp. 42–45.
Schwab et al., "Compact High-Power N$_2$ Laser: . . .", IEEE J. of Quantum Electronics, vol. QE-12, No. 3, 1976, pp. 183–188.

Primary Examiner—William L. Sikes
Assistant Examiner—B. Randolph
Attorney, Agent, or Firm—Hill, Van Santen, Steadman & Simpson

[57] ABSTRACT

A gas laser comprises a discharge channel which is defined by two electrodes located on a dielectric layer spaced from one another. The dielectric layer forms a carrier which has a further electrode on the opposite side thereof. A laser head is connected to one end of this structure and includes a laser active gas encompassing a dielectric plate optically coupled to the discharge channel. The first of the two electrodes extends into the laser head and the last-mentioned electrode wraps around the end of the dielectric plate to the plane of the plane of the first electrode and to a point spaced therefrom to form a gap which is a surface discharge gap. The other end of the structure is connected to a high-voltage pulse generator including a switch operable to connect the two electrodes and generate a rapidly rising voltage pulse. The first of the two electrodes and the further electrode are connected to a reference potential by way of respective inductances.

17 Claims, 2 Drawing Sheets

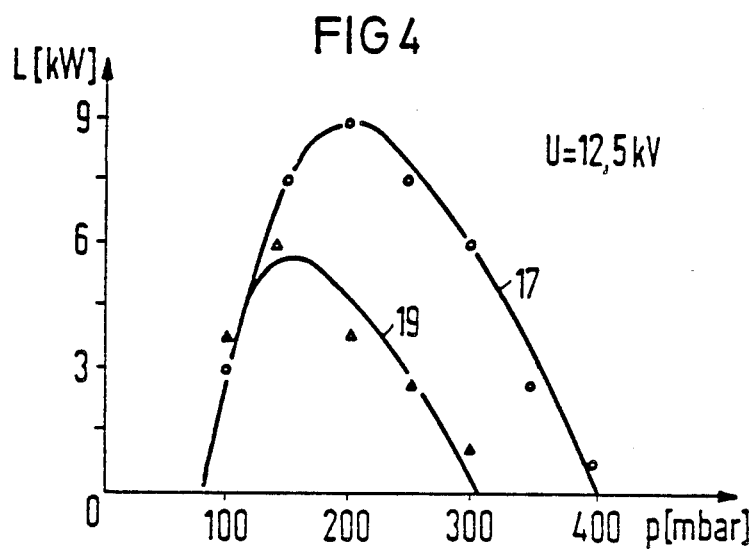
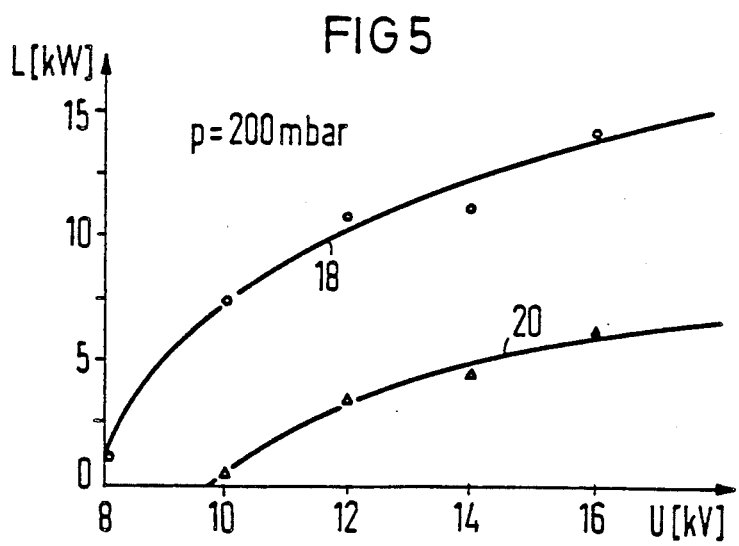

METHOD FOR THE OPERATION OF A GAS LASER AND A GAS LASER OPERATED IN ACCORD THEREWITH

BACKGROUND OV THE INVENTION

1. Field of the Invention

The invention relates to an operating method in accord with the an arrangement in which a plate of dielectric material carries two electrodes on its one side, a gap therebetween, a third plane or electrode on the other side covering at least the base area of a discharge channel, a laser-active gas in the discharge channel and a switchable high-voltage generator connected to the first two mentioned electrodes. Such a technique for generating laser pulses is disclosed, in general, for example, in Appl. Phys. Lett. 10 (1967) 3.

2. Description of the Prior Art

The cited publication proceeds on the basis of a laser type having the following structure: a dielectric insulating plate, preferably a plastic film, is situated between two metal plates. The upper metal plate of this ribbon conductor is divided into two parts by a gap in which a laser-active gas (nitrogen or neon) is situated. Both parts lie at a positive potential of a few 10 kV, whereas the lower metal plate is grounded. By means of a fast, high-capacity switch, a short-circuit is produced between the one plate part and the lower plate during operation of the laser. A short, steeply rising discharge current wave arises, this running through the ribbon conductor to the gap and initiating a gas discharge there. This plasma then produces the required occupation inversion, whereby the gain is so high that a rather intense laser pulse arises even without optical feedback.

In order to further boost the output power of this super radiator, an attempt can be made to increase the gas pressure p and the discharge voltage U and to simultaneously shorten the current rise time $\tau$. The latitude here, however, is relatively small, particularly because the plasma becomes inhomogeneous given an increasing pressure p and/or voltage U and converts into arc discharges having little effect. There are possibilities for making the occurrence of such plasma instabilities more difficult. Thus, it has been envisioned to meander the discharge electrodes along the gap (German OS No. 24 30 241), to provide the cathode surface with a plurality of sharp blades and/or to pre-ionize the gas (Rev. Sci. Instrum. 55 (1984)166). All of these measures certainly improve the quality of the discharge; however, they are relatively involved and also partly require additional space.

SUMMARY OF THE INVENTION

The invention is therefore based on the object of providing an excitation technique for a laser of the species initially cited which also enables a three-dimensionally uniform occupation inversion without special provisions and thereby requires no additional structural volume. This object is achieved in accord with the invention by the method comprising the features of exciting the laser-active gas with a high voltage pulse which is generated between the first two mentioned electrodes by connecting a high-voltage generator thereto which triggers a gas discharge in the discharge channel, the discharge channel including a surface discharge along a further dielectric plate connected to the aforementioned dielectric plate.

Given the proposed method, the laser activity is not effected, as was heretofore done, by a free discharge between metal electrodes, but is effected by a surface discharge along the dielectric plate.

Surface discharge, which is also frequently referred to as "creeping discharge" or "gliding discharge" in the literature, is a phenomenon that is well known per se. It has also already been employed in the field of gas lasers for a long time, however only as an ultraviolet light source for initiating a free discharge (Appl. Phys. Lett. 25 (1974) 654, J. Phys. E: Sci. Instrum. (1980) 632). Insofar as known, no one has yet arrived at the idea of using this type of discharge as the pump source itself, instead.

The physical events under which the surface discharge is triggered, forwarded and maintained have not yet been clarified in detail. The fact is, however, that the discharge occurs in a relatively thin layer which is usually less than 100 $\mu$m thick, that the dielectric surface is involved in the discharge, and that the discharge mechanisms depend on the polarity of the voltage. When the one discharge electrode acts as cathode with respect to the other two electrodes, then the plasma probably begins as a purely dielectric discharge in the cathode region and then migrates by generating secondary electrons in the plate surface until the counter electrode is involved.

Given an inverted operational sign of the voltage, the nature of the discharge cannot be interpreted without further ado; it is not even certain whether the plasma commences at all at one of the two discharge electrodes. What is certain, however, is that a homogeneous surface discharge is extraordinarily promoted here. Tests have shown that the plasma is homogeneous over the greatest time of its existence and in the greatest part of its volume when, namely, the discharge voltage pulse rises steeply—at about 5 kV/nsec—and decays again after a short time, for example, 10 nsec. The discharge geometry (plate thickness, electrode spacing, electrode profile) is thereby relatively uncritical. The gas pressure and the charging voltage can also be varied within relatively wide limits. What values these parameters are lent on a case-by-case basis depends, last but not least, on the type of laser-active gas as well. Numerical example and possible value ranges shall be set forth farther below for nitrogen.

A voltage rise of 5 kV/nsec requires a discharge circuit having a self-inductance on the order of magnitude of 1 nH and a switch which governs high powers in a switching time of about 1 nsec. These demands can be relatively easily met, for example with a high-voltage generator on a ribbon conductor basis (Blümlein generator) and a (mechanically triggered) oil spark gap.

As a result, an inexpensive, compact short-duration light source is obtained which emits intense light pulses having good directional characteristic. It can be employed, for example, in short-duration photography, in range measurements, as a source for dyestuff lasers, for spectroscopic investigations, for triggering semiconductor switches or as a landing aid for aircraft.

BRIEF DESCRIPTION OF THE DRAWINGS

The proposed solution shall now be set forth in greater detail with reference to a preferred exemplary embodiment in conjunction with the attached drawing. Shown therein are:

FIG. 4 the laser power L as a function of the charging voltage and the polarity; and FIG. 5 the laser power entered relative to the pressure and the polarity given a defined charging voltage.

DESCRIPTION OF THE PREFERRED EMBODIMENTS

Figure 1:
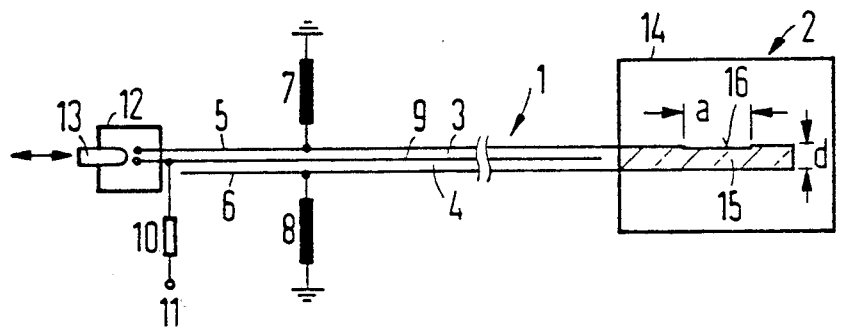
FIG. 1 an N$_2$ laser of the invention in a schematic side view.

The laser of FIG. 1 contains a high-voltage generator 1 as well as a laser head 2. The generator 1 is a folded Blümlein generator. It is composed of two epoxy resin layers 3,4 each 40 cm long, 5 cm wide and 0.15 cm thick which are laminated at both sides with a respective copper foil and placed flat against one another. The outer copper foils 5,6 of this double ribbon conductor are connected to ground via inductances 7,8, whereas the inner copper foil 9 lies at a 10 kV voltage source 11 via a resistor 10. A switch is situated at the one end of the ribbon conductor, this switch connecting the foils 5 and 9 to one another and, in the present embodiment, being realized by a mechanically triggered oil spark gap. In FIG. 1, this switch is symbolized by a housing 12 having a displaceable contact bridge 13.

The overall discharge circuit has a capacitance of about 1.8nF and a limit frequency >200 MHz. The double ribbon conductor has an intrinsic impedance of 4.3Ω and the oil spark gap has a switching time of about 1.5 nsec.

At its end facing away from the switch, the ribbon conductor merges into the laser head 2. This unit contains a chamber 14 filled with 200 mbar of nitrogen and a glass plate 15 which is about 1 mm thick. It may be derived from the drawing that the glass plate continues the epoxy resin layers and that a discharge channel 16 is defined on the upper side of the plate. This channel is formed in that the outer foil 6 is conducted around the distal end of the plate 15 facing away from the switch and maintains a spacing of about 1 cm from the outside foil 5. The overall laser head has an inductance of 0.5 nH.

Figure 2:
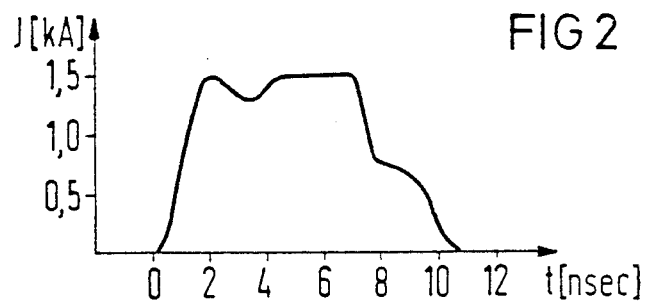
FIG. 2 the current J supplied by the high-voltage generator as as function of the time t.
Figure 3:
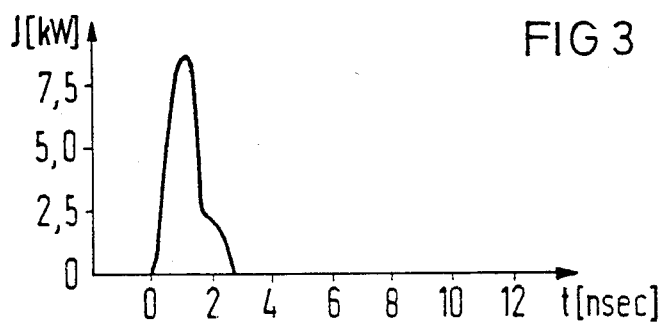
FIG. 3 the chronological curve of the laser pulse given prescribed pressure and charging voltage values p and, respectively, U.
Figure 6:
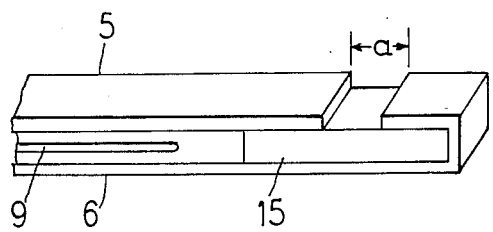

The laser is operated in the following manner: When the switch is closed, then a current pulse propagates between the foils 5 and 9. As a consequence of the good impedance matching, this pulse has a nearly rectangular curve. FIG. 2 shows that the current rises to about 1.5 kA with 0.75 kA/nsec and lasts about 10 nsec. When the current reaches the discharge channel 16, it triggers a surface discharge which becomes homogeneous within an extremely short time and lasts for about 15 nsec. Without employing an optical resonator, a laser pulse arises with a delay of about 7 nsec, this laser pulse having a half-width value of 1.5 nsec (FWHM) (FIG. 3) and a maximum power of 15 kW (FIG. 5). The pulse energy amounts to about 22.5 μJ and the specific power has a value of about 420 kW/cm$^3$. The laser-active layer thickness, which can be estimated from the emission crossection taking the diffractionconditioned emission divergence into consideration, lies at about 70 μm.

The described laser execution is not yet optimized. Similar or even better characteristic data can be achieved with other configurations as well. Individual actuating variables can thereby be varied within great bandwidths, as proceeds from the following data.

Thus, the thickness d of the dielectric plate could be varied between 0.3 mm and 3 mm without further ado. The only essential criterion for the thickness dimension is that, first of all, an adequately intense surface discharge arises and, secondly, the high-voltage generator remains electrically matched. The electrode spacing a could have a value between 2 mm and 20 mm. This great value range is possible because it is basically only a matter of preventing a free discharge and of enabling a favorable E/p value (E=field strength in the gap, p=gas pressure). As FIGS. 4 and 5 show, the gas pressure and the charging voltage are also relatively uncritical values. It proceeds from FIG. 4 wherein the laser power L is entered relative to p given a charging voltage U of 12.5 kV that laser activity occurs given pressures between 100 mbar and 400 mbar (curve 17). And it may be derived from FIG. 5 that the laser power begins at 8 kV given a pressure of 200 mbar, rises with increasing values of U, and does not yet exhibit saturation at at least 16 kV (curve 18).

For purposes of comparison, FIGS. 4 and 5 also show L-values that are obtained given reversed ("negative") voltage polarity (curves 19 and, respectively, 20). The comparison curves show a noticeably poorer power characteristic: given a charging voltage of 12.5 kV, the power maximum is nearly halved and, given a gas pressure of 200 mbar, the laser activity does not begin until a charging voltage of 10 kV and does not yield even half the power, at least up to 16 kV. This differeences are to be attributed thereto that the surface discharge given positive polarity proceeds in the form of a homogeneous glow discharge and degenerates into a bundle of thread-like arc discharges given negative polarity.

The invention is not limited to the exemplary embodiment which has been set forth and to the indicated possibilities of modification. Thus, in addition to nitrogen, other laser gases (emitting in the ultraviolet) also come into consideration, for instance air, hydrogen or excimers; some of these gasses then require an optical resonator. Apart from this, the high-voltage generator could also be realized in some other way, for instance with coaxial conductors. What is thereby important, however, is that the intrinsic impedance remains low so that an adequate amount of energy can be supplied with the gas with a voltage below the punch-through voltage. Moreover,the oil spark gap could also be replaced by other fast high-capacity switches, for example, thyratrons.

We claim:

1. A gas laser comprising:
    first and second elongate layers of dielectric material extending parallel to one another and including a common section at a first end thereof, and respective second ends;
    a dielectric plate mechanically coupled to and extending from said common section;
    a chamber housing said dielectric plate and including a laseractive gas at a pressure above 100 mbar;
    first, second and third electrodes, said first electrode carried on said first layer, said second electrode carried between said first and second layers and including an end defining a limiting end of said common section opposite said dielectric plate,and said third electrode carried on said second layer and forming a laminae structure;
    said first electrode extending over a portion of said dielectric plate and said third electrode extending about the distal end of said dielectric plate and over to the plane of said first electrode to a point spaced from said first electrode to define a discharge gap therebetween; and a high-voltage pulse generator electrically connected to said electrodes at the respective second ends of said dielectric layers and including first means connecting said first and third electrodes to a reference potential, second means connecting said second electrode to a high-voltage source, and switch means operable to connect and disconnect said first and second electrodes and generate voltage pulses of at least 8 kV therebetween with a rise greater than 1.5 kV per nanosecond.

2. The gas laser of claim 1, wherein:
said first means comprises a first inductor connecting said first electrode to the reference potential and a second inductor connecting said third electrode to said reference potential.

3. The gas laser of claim 1, wherein:
said second means comprises a resistor connecting said second electrode to the high-voltage source.

4. The gas laser of claim 1, wherein:
said high-voltage pulse generator is constructed to provide a high-voltage pulse rise of greater than 2 kV per nanosecond.

5. The gas laser of claim 1, wherein:
said switch means comprises a manually-operable switch.

6. The gas laser of claim 5, wherein:
said switch means further comprises an oil spark gap.

7. The gas laser of claim 1, wherein:
said dielectric plate comprises a secondary electron emission coefficient of more than 2.

8. The gas laser of claim 1, wherein:
said dielectric plate comprises glass.

9. The gas laser of claim 1, wherein:
said dielectric plate comprises a thickness of approximately 1 mm.

10. The gas laser of claim 1, wherein:
said laser-active gas comprises $N_2$.

11. The gas laser of claim 1, wherein:
said high-voltage pulse generator is constructed to generate a pulse in the range of between 9 and 14 kV.

12. The gas laser of claim 1, wherein:
said high-voltage pulse generator is constructed to generate a pulse of not greater than 20 kV.

13. The gas laser of claim 1, wherein:
said chamber comprises the laser-active gas at a pressure of between 150 mbar and 250 mbar.

14. The gas laser of claim 1, wherein:
said first and third electrodes are spaced in a range of between 0.3 mm and 3 mm.

15. The gas laser of claim 1, wherein:
said first and third electrodes are spaced in a range of between 0.6 mm and 1.4 mm.

16. A gas laser comprising:
first and second elongate layers of dielectric material extending parallel to one another and including a common section at a first end thereof, and respective second ends;

a dielectric plate mechanically coupled to and extending from said common section;

a chamber housing said dielectric plate and including a laseractive gas at a pressure above 100 mbar;

first, second and third electrodes, said first electrode carried on said first layer, said second electrode carried between said first and second layers, and including an end spaced from said dielectric plate to define a limit of said common section, and said third electrode carried on said second layer forming a laminae structure;

said first electrode extending over a portion of said dielectric plate and said third electrode extending about the distal end of said dielectric plate and over to the plane of said first electrode to a point spaced from said first electrode to define a discharge gap therebetween with an electrode spacing in the range of 2 1 mm and 20 mm; and a high-voltage pulse generator electrically connected to said electrodes at the respective second ends of said dielectric layers and including first means connecting said first and third electrodes to a reference potential, second means connecting said second electrode to a high-voltage source, and switch means operable to connect and disconnect said first and second electrodes and generate voltage pulses of at least 8 kV therebetween with a rise greater than 1.5 kV per nanosecond.

17. The gas laser of claim 16, wherein:
the electrode spacing of said discharge gap is in the range of 5 mm and 15 mm.

* * * * *